(12) United States Patent
Pasquero et al.

(10) Patent No.: US 9,063,653 B2
(45) Date of Patent: Jun. 23, 2015

(54) RANKING PREDICTIONS BASED ON TYPING SPEED AND TYPING CONFIDENCE

(75) Inventors: Jerome Pasquero, Montreal (CA); Jason Tyler Griffin, Kitchener (CA); Donald Somerset McCulloch McKenzie, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 230 days.

(21) Appl. No.: 13/601,898

(22) Filed: Aug. 31, 2012

(65) Prior Publication Data

US 2014/0062886 A1    Mar. 6, 2014

(51) Int. Cl.
G06F 3/041 (2006.01)
G06F 3/0488 (2013.01)
G06F 3/023 (2006.01)

(52) U.S. Cl.
CPC .......... G06F 3/04886 (2013.01); G06F 3/0237 (2013.01)

(58) Field of Classification Search
CPC .......... G06F 3/02; G06F 3/041; G06F 3/048; G06F 3/04883; G06F 3/04886; G06F 17/276
USPC .................. 345/156, 168, 169, 173; 715/773
See application file for complete search history.

(56) References Cited

U.S. PATENT DOCUMENTS

| | | |
|---|---|---|
| 3,872,433 A | 3/1975 | Holmes et al. |
| 4,408,302 A | 10/1983 | Fessel et al. |
| 5,261,009 A | 11/1993 | Bokser |
| 5,664,127 A | 9/1997 | Anderson et al. |
| 5,832,528 A | 11/1998 | Kwatinetz et al. |
| 5,963,671 A | 10/1999 | Comerford et al. |
| 6,002,390 A | 12/1999 | Masui |
| 6,064,340 A | 5/2000 | Martin et al. |
| 6,094,197 A | 7/2000 | Buxton et al. |
| 6,223,059 B1 | 4/2001 | Haestrup |
| 6,226,299 B1 | 5/2001 | Henson |
| 6,351,634 B1 | 2/2002 | Shin |
| 6,421,453 B1 | 7/2002 | Kanevsky et al. |
| 6,573,844 B1 | 6/2003 | Venolia et al. |
| 6,621,424 B1 | 9/2003 | Brand |
| 6,646,572 B1 | 11/2003 | Brand |

(Continued)

FOREIGN PATENT DOCUMENTS

| | | |
|---|---|---|
| CA | 2688204 A1 | 7/2010 |
| CA | 2812457 | 10/2013 |

(Continued)

OTHER PUBLICATIONS

"Windows Mobile Café—Software (Freeware): Touchpal, Let's Try Tabbing Up to 300 Chars/Min", Nov. 4, 2007, retrieved from URL:http://windows-mobile-cafe.blogspot.nl/2007/11/software-freeware-touchpal-lets-try.html, accessed online Jan. 18, 2013 (2 pages).

(Continued)

*Primary Examiner* — Joe H Cheng
(74) *Attorney, Agent, or Firm* — Fish & Richardson P.C.

(57) ABSTRACT

A method that includes receiving an input string, ranking, by the processor, a predicted string associated with the input string, wherein the ranking depends on whether the input string is a substring of the predicted string and at least on one of a typing speed and a typing confidence, and displaying the ranked predicted string.

20 Claims, 3 Drawing Sheets

(56) References Cited

U.S. PATENT DOCUMENTS

| | | |
|---|---|---|
| 6,801,190 B1 | 10/2004 | Robinson et al. |
| 7,061,403 B2 | 6/2006 | Fux |
| 7,098,896 B2 | 8/2006 | Kushler et al. |
| 7,107,204 B1 | 9/2006 | Liu et al. |
| 7,216,588 B2 | 5/2007 | Suess |
| 7,259,752 B1 | 8/2007 | Simmons |
| 7,277,088 B2 | 10/2007 | Robinson et al. |
| 7,292,226 B2 | 11/2007 | Matsuura et al. |
| 7,382,358 B2 | 6/2008 | Kushler et al. |
| 7,394,346 B2 | 7/2008 | Bodin |
| 7,443,316 B2 | 10/2008 | Lim |
| 7,479,949 B2 | 1/2009 | Jobs et al. |
| 7,487,461 B2 | 2/2009 | Zhai et al. |
| 7,526,316 B2 | 4/2009 | Shimizu |
| 7,530,031 B2 | 5/2009 | Iwamura et al. |
| 7,539,472 B2 | 5/2009 | Sloo |
| 7,661,068 B2 | 2/2010 | Lund |
| 7,671,765 B2 | 3/2010 | Fux |
| 7,698,127 B2 | 4/2010 | Trower, II et al. |
| 7,886,233 B2 | 2/2011 | Rainisto et al. |
| 7,934,156 B2 | 4/2011 | Forstall et al. |
| 8,023,930 B2 | 9/2011 | Won |
| 8,059,101 B2 | 11/2011 | Westerman et al. |
| 8,065,624 B2 | 11/2011 | Morin et al. |
| 8,201,087 B2 | 6/2012 | Kay et al. |
| 8,225,203 B2 | 7/2012 | Unruh |
| 8,289,283 B2 | 10/2012 | Kida et al. |
| 8,326,358 B2 | 12/2012 | Runstedler et al. |
| 8,490,008 B2 | 7/2013 | Griffin et al. |
| 8,516,386 B2 | 8/2013 | Adam et al. |
| 8,542,206 B2 | 9/2013 | Westerman et al. |
| 2002/0080186 A1 | 6/2002 | Frederiksen |
| 2002/0097270 A1 | 7/2002 | Keely et al. |
| 2002/0154037 A1 | 10/2002 | Houston |
| 2002/0180797 A1 | 12/2002 | Bachmann |
| 2004/0111475 A1 | 6/2004 | Schultz |
| 2004/0135818 A1 | 7/2004 | Thomson et al. |
| 2004/0140956 A1 | 7/2004 | Kushler et al. |
| 2004/0153963 A1 | 8/2004 | Simpson et al. |
| 2004/0168131 A1 | 8/2004 | Blumberg |
| 2004/0201576 A1 | 10/2004 | Shimada et al. |
| 2005/0017954 A1 | 1/2005 | Kay et al. |
| 2005/0024341 A1 | 2/2005 | Gillespie et al. |
| 2005/0039137 A1 | 2/2005 | Bellwood et al. |
| 2005/0052425 A1 | 3/2005 | Zadesky et al. |
| 2005/0093826 A1 | 5/2005 | Huh |
| 2005/0162407 A1 | 7/2005 | Sakurai et al. |
| 2005/0195173 A1 | 9/2005 | McKay |
| 2005/0244208 A1 | 11/2005 | Suess |
| 2005/0275632 A1 | 12/2005 | Pu et al. |
| 2005/0283358 A1 | 12/2005 | Stephanick et al. |
| 2006/0022947 A1 | 2/2006 | Griffin et al. |
| 2006/0026521 A1 | 2/2006 | Hotelling et al. |
| 2006/0033724 A1 | 2/2006 | Chaudhri et al. |
| 2006/0053387 A1 | 3/2006 | Ording |
| 2006/0176283 A1 | 8/2006 | Suraqui |
| 2006/0209040 A1 | 9/2006 | Garside et al. |
| 2006/0239562 A1 | 10/2006 | Bhattacharyay et al. |
| 2006/0253793 A1 | 11/2006 | Zhai et al. |
| 2006/0265648 A1 | 11/2006 | Rainisto et al. |
| 2006/0265668 A1 | 11/2006 | Rainisto |
| 2006/0279548 A1 | 12/2006 | Geaghan |
| 2007/0015534 A1 | 1/2007 | Shimizu |
| 2007/0040813 A1 | 2/2007 | Kushler et al. |
| 2007/0046641 A1 | 3/2007 | Lim |
| 2007/0061753 A1 | 3/2007 | Ng et al. |
| 2007/0150842 A1 | 6/2007 | Chaudhri et al. |
| 2007/0156394 A1 | 7/2007 | Banerjee et al. |
| 2007/0157085 A1 | 7/2007 | Peters |
| 2007/0229476 A1* | 10/2007 | Huh ............. 345/173 |
| 2007/0256029 A1 | 11/2007 | Maxwell |
| 2007/0263932 A1 | 11/2007 | Bernardin et al. |
| 2008/0033713 A1 | 2/2008 | Brostrom |
| 2008/0100581 A1 | 5/2008 | Fux |
| 2008/0122796 A1 | 5/2008 | Jobs et al. |
| 2008/0126387 A1 | 5/2008 | Blinnikka |
| 2008/0136587 A1 | 6/2008 | Orr |
| 2008/0141125 A1 | 6/2008 | Ghassabian |
| 2008/0158020 A1 | 7/2008 | Griffin |
| 2008/0168366 A1* | 7/2008 | Kocienda et al. ............. 715/764 |
| 2008/0184360 A1 | 7/2008 | Kornilovsky et al. |
| 2008/0189605 A1 | 8/2008 | Kay et al. |
| 2008/0195388 A1 | 8/2008 | Bower et al. |
| 2008/0231610 A1 | 9/2008 | Hotelling et al. |
| 2008/0259040 A1 | 10/2008 | Ording et al. |
| 2008/0266261 A1 | 10/2008 | Idzik |
| 2008/0273013 A1 | 11/2008 | Levine et al. |
| 2008/0281583 A1 | 11/2008 | Slothouber et al. |
| 2008/0304890 A1 | 12/2008 | Shin et al. |
| 2008/0309644 A1 | 12/2008 | Arimoto |
| 2008/0316183 A1 | 12/2008 | Westerman et al. |
| 2008/0318635 A1 | 12/2008 | Yoon et al. |
| 2009/0002326 A1 | 1/2009 | Pihlaja |
| 2009/0006991 A1 | 1/2009 | Lindberg et al. |
| 2009/0025089 A1 | 1/2009 | Martin et al. |
| 2009/0058823 A1 | 3/2009 | Kocienda |
| 2009/0058830 A1 | 3/2009 | Herz et al. |
| 2009/0066668 A1 | 3/2009 | Kim et al. |
| 2009/0077464 A1 | 3/2009 | Goldsmith et al. |
| 2009/0085881 A1 | 4/2009 | Keam |
| 2009/0094562 A1 | 4/2009 | Jeong et al. |
| 2009/0125848 A1 | 5/2009 | Keohane et al. |
| 2009/0132576 A1 | 5/2009 | Miller et al. |
| 2009/0144667 A1 | 6/2009 | Christoffersson et al. |
| 2009/0150785 A1 | 6/2009 | Asami et al. |
| 2009/0160800 A1 | 6/2009 | Liu et al. |
| 2009/0167700 A1 | 7/2009 | Westerman et al. |
| 2009/0174667 A1 | 7/2009 | Kocienda et al. |
| 2009/0193334 A1 | 7/2009 | Assadollahi |
| 2009/0213081 A1 | 8/2009 | Case, Jr. |
| 2009/0228792 A1 | 9/2009 | Van Os et al. |
| 2009/0228842 A1 | 9/2009 | Westerman et al. |
| 2009/0237361 A1 | 9/2009 | Mosby et al. |
| 2009/0240949 A9 | 9/2009 | Kitchens et al. |
| 2009/0247112 A1 | 10/2009 | Lundy et al. |
| 2009/0251410 A1 | 10/2009 | Mori et al. |
| 2009/0254818 A1 | 10/2009 | Jania et al. |
| 2009/0259962 A1 | 10/2009 | Beale |
| 2009/0265669 A1 | 10/2009 | Kida et al. |
| 2009/0267909 A1 | 10/2009 | Chen et al. |
| 2009/0284471 A1 | 11/2009 | Longe et al. |
| 2009/0295737 A1 | 12/2009 | Goldsmith et al. |
| 2009/0307768 A1 | 12/2009 | Zhang et al. |
| 2009/0313693 A1 | 12/2009 | Rogers |
| 2010/0020033 A1 | 1/2010 | Nwosu |
| 2010/0020036 A1 | 1/2010 | Hui et al. |
| 2010/0026650 A1 | 2/2010 | Srivastava et al. |
| 2010/0045705 A1 | 2/2010 | Vertegaal et al. |
| 2010/0050121 A1 | 2/2010 | Shin |
| 2010/0052880 A1 | 3/2010 | Laitinen et al. |
| 2010/0070908 A1 | 3/2010 | Mori et al. |
| 2010/0079413 A1 | 4/2010 | Kawashima et al. |
| 2010/0095238 A1 | 4/2010 | Baudet |
| 2010/0097321 A1 | 4/2010 | Son et al. |
| 2010/0115402 A1 | 5/2010 | Knaven et al. |
| 2010/0127991 A1 | 5/2010 | Yee |
| 2010/0131900 A1 | 5/2010 | Spetalnick |
| 2010/0141590 A1 | 6/2010 | Markiewicz et al. |
| 2010/0156813 A1 | 6/2010 | Duarte et al. |
| 2010/0156818 A1 | 6/2010 | Burrough et al. |
| 2010/0161538 A1 | 6/2010 | Kennedy, Jr. et al. |
| 2010/0192086 A1 | 7/2010 | Kocienda et al. |
| 2010/0197352 A1 | 8/2010 | Runstedler et al. |
| 2010/0199176 A1 | 8/2010 | Chronqvist |
| 2010/0225599 A1 | 9/2010 | Danielsson et al. |
| 2010/0235726 A1 | 9/2010 | Ording et al. |
| 2010/0253620 A1 | 10/2010 | Singhal |
| 2010/0257478 A1 | 10/2010 | Longe et al. |
| 2010/0257490 A1 | 10/2010 | Lyon et al. |
| 2010/0259482 A1 | 10/2010 | Ball |
| 2010/0259561 A1 | 10/2010 | Forutanpour et al. |
| 2010/0265181 A1 | 10/2010 | Shore |
| 2010/0269040 A1 | 10/2010 | Lee |
| 2010/0277424 A1 | 11/2010 | Chang et al. |

(56) References Cited

U.S. PATENT DOCUMENTS

| | | |
|---|---|---|
| 2010/0287486 A1 | 11/2010 | Coddington |
| 2010/0292984 A1 | 11/2010 | Huang et al. |
| 2010/0293475 A1 | 11/2010 | Nottingham et al. |
| 2010/0295801 A1 | 11/2010 | Bestle et al. |
| 2010/0313127 A1 | 12/2010 | Gosper et al. |
| 2010/0313158 A1 | 12/2010 | Lee et al. |
| 2010/0315266 A1* | 12/2010 | Gunawardana et al. ........ 341/22 |
| 2010/0325721 A1 | 12/2010 | Bandyopadhyay et al. |
| 2010/0333027 A1 | 12/2010 | Martensson et al. |
| 2011/0010655 A1 | 1/2011 | Dostie et al. |
| 2011/0018812 A1 | 1/2011 | Baird |
| 2011/0029862 A1 | 2/2011 | Scott et al. |
| 2011/0035696 A1 | 2/2011 | Elazari et al. |
| 2011/0041056 A1 | 2/2011 | Griffin et al. |
| 2011/0043455 A1 | 2/2011 | Roth et al. |
| 2011/0060984 A1 | 3/2011 | Lee |
| 2011/0061029 A1 | 3/2011 | Yeh et al. |
| 2011/0063231 A1 | 3/2011 | Jakobs et al. |
| 2011/0074704 A1 | 3/2011 | Causey et al. |
| 2011/0078613 A1 | 3/2011 | Bangalore |
| 2011/0086674 A1 | 4/2011 | Rider et al. |
| 2011/0090151 A1* | 4/2011 | Huang et al. ................ 345/168 |
| 2011/0099505 A1 | 4/2011 | Dahl |
| 2011/0099506 A1 | 4/2011 | Gargi et al. |
| 2011/0119623 A1 | 5/2011 | Kim |
| 2011/0148572 A1 | 6/2011 | Ku |
| 2011/0171617 A1 | 7/2011 | Yeh et al. |
| 2011/0179355 A1 | 7/2011 | Karlsson |
| 2011/0193797 A1* | 8/2011 | Unruh ............................ 345/173 |
| 2011/0201387 A1* | 8/2011 | Paek et al. ...................... 455/566 |
| 2011/0202835 A1 | 8/2011 | Jakobsson et al. |
| 2011/0202876 A1 | 8/2011 | Badger et al. |
| 2011/0209087 A1 | 8/2011 | Guyot-Sionnest |
| 2011/0233407 A1 | 9/2011 | Wu et al. |
| 2011/0239153 A1 | 9/2011 | Carter et al. |
| 2011/0242138 A1 | 10/2011 | Tribble |
| 2011/0248945 A1 | 10/2011 | Higashitani |
| 2011/0249076 A1 | 10/2011 | Zhou et al. |
| 2011/0256848 A1 | 10/2011 | Bok et al. |
| 2011/0285656 A1 | 11/2011 | Yaksick et al. |
| 2011/0291940 A1 | 12/2011 | Ghassabian |
| 2011/0302518 A1 | 12/2011 | Zhang |
| 2011/0305494 A1 | 12/2011 | Kang |
| 2012/0005576 A1 | 1/2012 | Assadollahi |
| 2012/0023447 A1 | 1/2012 | Hoshino et al. |
| 2012/0029910 A1 | 2/2012 | Medlock et al. |
| 2012/0030566 A1 | 2/2012 | Victor |
| 2012/0030623 A1 | 2/2012 | Hoellwarth |
| 2012/0030624 A1 | 2/2012 | Migos |
| 2012/0036469 A1 | 2/2012 | Suraqui |
| 2012/0053887 A1 | 3/2012 | Nurmi |
| 2012/0062465 A1 | 3/2012 | Spetalnick |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0084734 A1 | 4/2012 | Wilairat |
| 2012/0092278 A1 | 4/2012 | Yamano |
| 2012/0110518 A1 | 5/2012 | Chan et al. |
| 2012/0117506 A1 | 5/2012 | Koch et al. |
| 2012/0119997 A1 | 5/2012 | Gutowitz |
| 2012/0149477 A1 | 6/2012 | Park et al. |
| 2012/0159317 A1 | 6/2012 | Di Cocco et al. |
| 2012/0162081 A1 | 6/2012 | Stark |
| 2012/0166696 A1 | 6/2012 | Kallio et al. |
| 2012/0167009 A1* | 6/2012 | Davidson et al. ............. 715/816 |
| 2012/0223959 A1 | 9/2012 | Lengeling |
| 2012/0306772 A1 | 12/2012 | Tan et al. |
| 2012/0311437 A1 | 12/2012 | Weeldreyer et al. |
| 2013/0007606 A1 | 1/2013 | Dolenc |
| 2013/0050222 A1 | 2/2013 | Moran et al. |
| 2013/0061317 A1 | 3/2013 | Runstedler et al. |
| 2013/0063356 A1 | 3/2013 | Martisauskas |
| 2013/0067382 A1 | 3/2013 | Townsend et al. |
| 2013/0067411 A1 | 3/2013 | Kataoka et al. |
| 2013/0104068 A1 | 4/2013 | Murphy et al. |
| 2013/0120266 A1 | 5/2013 | Griffin et al. |
| 2013/0120267 A1 | 5/2013 | Pasquero et al. |
| 2013/0120268 A1 | 5/2013 | Griffin et al. |
| 2013/0125034 A1* | 5/2013 | Griffin et al. ................. 715/773 |
| 2013/0125036 A1 | 5/2013 | Griffin et al. |
| 2013/0125037 A1 | 5/2013 | Pasquero et al. |
| 2013/0176228 A1 | 7/2013 | Griffin et al. |
| 2013/0187858 A1 | 7/2013 | Griffin et al. |
| 2013/0187868 A1 | 7/2013 | Griffin et al. |
| 2013/0222249 A1* | 8/2013 | Pasquero et al. .............. 345/168 |
| 2013/0222255 A1 | 8/2013 | Pasquero et al. |
| 2013/0222256 A1 | 8/2013 | Pasquero et al. |
| 2013/0246329 A1* | 9/2013 | Pasquero et al. ................ 706/52 |
| 2013/0263038 A1 | 10/2013 | Griffin et al. |
| 2013/0271375 A1 | 10/2013 | Griffin et al. |
| 2013/0271385 A1* | 10/2013 | Griffin et al. ................. 345/173 |
| 2013/0275923 A1* | 10/2013 | Griffin et al. ................. 715/863 |
| 2013/0285916 A1* | 10/2013 | Griffin et al. ................. 345/169 |
| 2013/0285927 A1 | 10/2013 | Pasquero et al. |
| 2013/0285928 A1 | 10/2013 | Thorsander |
| 2013/0285930 A1 | 10/2013 | Thorsander et al. |
| 2013/0290906 A1 | 10/2013 | Thorsander |
| 2013/0314331 A1 | 11/2013 | Rydenhag et al. |
| 2013/0325438 A1* | 12/2013 | Griffin et al. ..................... 704/9 |
| 2013/0342452 A1 | 12/2013 | Kuo et al. |
| 2014/0002363 A1 | 1/2014 | Griffin et al. |
| 2014/0062886 A1 | 3/2014 | Pasquero et al. |
| 2014/0062923 A1 | 3/2014 | Thorsander et al. |
| 2014/0063067 A1 | 3/2014 | Compton et al. |
| 2014/0067372 A1* | 3/2014 | Pasquero et al. ................... 704/9 |
| 2014/0164977 A1 | 6/2014 | Spetalnick |

FOREIGN PATENT DOCUMENTS

| | | |
|---|---|---|
| CA | 2812457 A1 | 10/2013 |
| CA | 2813393 | 10/2013 |
| CA | 2813393 A1 | 10/2013 |
| CA | 2819839 A1 | 12/2013 |
| CA | 2820997 A1 | 1/2014 |
| CN | 101021762 A | 8/2007 |
| EP | 0844571 A2 | 5/1998 |
| EP | 0880090 A2 | 11/1998 |
| EP | 0880090 A3 | 11/1998 |
| EP | 1847917 A2 | 10/2007 |
| EP | 1847917 A3 | 10/2007 |
| EP | 1850217 A2 | 10/2007 |
| EP | 1909161 A1 | 4/2008 |
| EP | 1939715 A1 | 7/2008 |
| EP | 1942398 A1 | 7/2008 |
| EP | 2077491 A1 | 7/2009 |
| EP | 2109046 A1 | 10/2009 |
| EP | 2128750 A2 | 12/2009 |
| EP | 2146271 A2 | 1/2010 |
| EP | 2184686 A1 | 5/2010 |
| EP | 2214118 A1 | 8/2010 |
| EP | 2256614 A1 | 12/2010 |
| EP | 2282252 A1 | 2/2011 |
| EP | 2293168 A1 | 3/2011 |
| EP | 2320312 A1 | 5/2011 |
| EP | 2336851 A2 | 6/2011 |
| EP | 2381384 A1 | 10/2011 |
| EP | 2386976 A1 | 11/2011 |
| EP | 2402846 A2 | 1/2012 |
| EP | 2420925 A2 | 2/2012 |
| EP | 2431842 A2 | 3/2012 |
| EP | 2400426 B1 | 3/2013 |
| EP | 2618248 A1 | 7/2013 |
| EP | 2631758 A1 | 8/2013 |
| EP | 2653955 A1 | 10/2013 |
| EP | 2660697 A1 | 11/2013 |
| EP | 2660699 A1 | 11/2013 |
| EP | 2660727 A1 | 11/2013 |
| EP | 2703955 A1 | 3/2014 |
| EP | 2703956 A1 | 3/2014 |
| EP | 2703957 A1 | 3/2014 |
| EP | 2660696 B1 | 6/2014 |
| JP | 2011-197782 A | 10/2011 |
| JP | 2012-68963 A | 4/2012 |
| KR | 20120030652 A | 3/2012 |

(56) References Cited

FOREIGN PATENT DOCUMENTS

| WO | 03/029950 A2 | 4/2003 |
|----|----|----|
| WO | 03/054681 A1 | 7/2003 |
| WO | 04/001560 A1 | 12/2003 |
| WO | 2005/064587 A2 | 7/2005 |
| WO | 2006/100509 A2 | 9/2006 |
| WO | 2007/068505 A1 | 6/2007 |
| WO | 2007/076210 A1 | 7/2007 |
| WO | 2007/134433 A1 | 11/2007 |
| WO | 2008/030974 A1 | 3/2008 |
| WO | WO2008/057785 A2 | 5/2008 |
| WO | 2008/085741 A2 | 7/2008 |
| WO | 2009/019546 A2 | 2/2009 |
| WO | 2010/035574 A1 | 4/2010 |
| WO | 2010/035585 A1 | 4/2010 |
| WO | WO2010/035574 A1 | 4/2010 |
| WO | 2010/099835 A1 | 9/2010 |
| WO | WO2010/112841 A1 | 10/2010 |
| WO | 2011/073992 A2 | 6/2011 |
| WO | WO2011/073992 A2 | 6/2011 |
| WO | 2011/098925 A1 | 8/2011 |
| WO | WO2011/113057 A1 | 9/2011 |
| WO | 2012/043932 A1 | 4/2012 |
| WO | 2013/163718 A1 | 11/2013 |
| WO | 2013/164013 A1 | 11/2013 |

OTHER PUBLICATIONS

European Partial Search Report dated Jan. 16, 2013, issued in European Application No. 12182612.7 (5 pages).
European Partial Search Report dated Mar. 7, 2013, issued in European Application No. 12184574.7 (5 pages).
Extended European Search Report dated Aug. 31, 2012, issued in European Application No. 12166170.6 (7 pages).
Extended European Search Report dated Feb. 28, 2013, issued in European Application No. 12182610.1 (7 pages).
Extended European Search Report dated Jan. 25, 2013, issued in European Application No. 12166520.2 (8 pages).
Extended European Search Report dated Mar. 8, 2013, issued in European Application No. 12182611.9 (8 pages).
Extended European Search Report dated Nov. 22, 2012, issued in European Application No. 12172892.7 (7 pages).
Extended European Search Report dated Sep. 25, 2012, issued in European Application No. 12176453.4 (7 pages).
Extended European Search Report dated Sep. 25, 2012, issued in European Application No. 12180190.6 (8 pages).
Final Office Action dated Feb. 1, 2013, issued in U.S. Appl. No. 13/563,943 (17 pages).
Final Office Action dated Feb. 28, 2013, issued in U.S. Appl. No. 13/524,678 (21 pages).
Final Office Action dated Jan. 18, 2013, issued in U.S. Appl. No. 13/482,705 (18 pages).
Final Office Action dated Mar. 15, 2013, issued in U.S. Appl. No. 13/572,232 (36 pages).
iPhone J.D. Typing Letters or Symbols That Are Not on the iPhone Keyboard dated Mar. 19, 2010, accessed "http://www.iphonejd.com/iphone_jd2010/03/typing-letters-or-symbols-that-are-not-on-the-iphone-keyboard.html" on Feb. 26, 2013 (3 pages).
Notice of Allowance dated Mar. 15, 2013, issued in U.S. Appl. No. 13/373,356 (25 pages).
Office Action dated Dec. 28, 2012, issued in U.S. Appl. No. 13/459,301 (22 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Mar. 12, 2013, issued in U.S. Appl. No. 13/560,796 (22 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 8, 2012, issued in U.S. Appl. No. 13/373,356 (18 pages).
Office Action dated Oct. 26, 2012, issued in U.S. Appl. No. 13/554,436 (22 pages).
PCT International Search Report and Written Opinion dated Jan. 24, 2013, issued in International Application No. PCT/CA2012/050274 (9 pages).
PCT International Search Report and Written Opinion dated Nov. 7, 2012, issued in International Application No. PCT/CA2012/050362 (9 pages).
Swype Product Features, accessed online at http://www.swype.com/about/specifications/ on Feb. 25, 2013 (2 pages).
U.S. Appl. No. 13/616,423, filed Sep. 14, 2012 (30 pages).
U.S. Appl. No. 13/773,812, filed Feb. 22, 2013 (94 pages).
Wang, Feng, et al., "Detecting and Leveraging Finger Orientation for Interaction with Direct-Touch Surfaces", UIST '09, Oct. 4-7, 2009, Victoria, British Columbia, Canada (10 pages).
"Features Included in the T-Mobile G1", http://www.t-mobileg1.com/T-Mobile-G1-Features.pdf, 2009.
BlackBerry Seeker—Freeware—Pattern Lock v1.0.7, http://www.blackberryseeker.com/applications/preview/Pattern-Lock-v107.aspx, Jul. 28, 2009.
Chong et al., Exploring the Use of Discrete Gestures for Authentication, IFIP International Federation for Information Processing, 2009.
Conveniently select text, images, annotations, etc. in a PDF or any other text based mobile/tablet device, IP.com Journal, Mar. 1, 2011, XP013142665, (10 pages).
DROID X by Motorola © 2010 Screen shots.
DROID X by Motorola © 2010 User Manual (72 pages).
European Search Report dated Feb. 28, 2011, issued in European Patent Application No. 10160590.5.
Extended European Search Report dated Aug. 24, 2012, issued in European Application No. 12166115.1 (5 pages).
Extended European Search Report dated Oct. 9, 2012, issued in European Application No. 12166244.9 (6 pages).
Extended European Search Report dated Sep. 10, 2012, issued in European Application No. 12166246.4 (6 pages).
Extended European Search Report dated Sep. 10, 2012, issued in European Application No. 12166247.2 (8 pages).
Extended European Search Report dated Sep. 21, 2012, issued in European Application No. 12164240.9 (6 pages).
Extended European Search Report dated Sep. 25, 2012, issued in European Application No. 11192713.3 (7 pages).
Extended European Search Report dated Sep. 3, 2012, issued in European Application No. 12164300.1 (7 pages).
Google Mobile Help—Editing text, http://support.google.com/mobile/bin/answer.py?hl=en&answer=168926, date of access: Jun. 6, 2012 (2 pages).
GSMArena—Samsung announce s5600 & s5230 full touch midrange phones, http://www.gsmarena.com/samsung_announce_s5600_and_s5230_full_touch_midrange_phones-news-825.php, Mar. 10, 2009.
Hardware Sphere—Samsung s5600 & s5230 Touchscreen phones, http://hardwaresphere.com/2009/03/09/samsung-s5600-s5230-touchscreen-phones/, Mar. 9, 2009.
International Search Report and Written Opinion issued in International Application No. PCT/EP2012/057944, on Oct. 12, 2012, (10 pages).
International Search Report and Written Opinion issued in International Application No. PCT/IB2011/003273, on Jun. 14, 2012, (8 pages).
International Search Report and Written Opinion mailed Sep. 10, 2012, issued for International Application No. PCT/EP2012/057945 (11 pages).
iPhone User Guide—for iPhone OS 3.1 Software, 2009 (217 pages).
Madhvanath, Sriganesh, HP-Gesture based computing interfaces, Mar. 2008.
Manual del usuario Samsung Moment™ with Google™, dated May 20, 2012 (224 pages).

(56) References Cited

OTHER PUBLICATIONS

Merrett, Andy, "iPhone Os 3.0: How to cut, copy and paste text and images", http://www.iphonic.tv/2009/06/iphone_os_30_how_to_cut_copy_a.html, Jun. 18, 2009, XP002684215, (8 pages).
Mobile Tech News—Samsung launches new Gesture Lock touchscreen handsets, http://www.mobiletechnews.com/info/2009/03/11/124559.html, Mar. 11, 2009.
Partial European Search Report; Application No. 10160590.5; Sep. 16, 2010.
Sprint Support Tutorial Set the Screen Lock Pattern—Samsung Moment, http://support.sprint.com/support/tutorial/Set_the_Screen_Lock_Pattern_Samsung_Moment/10887-171, date of access: May 31, 2012 (9 pages).
Sprint Support Tutorial Unlock a Forgotten Lock Pattern—Samsung Moment, http://support.sprint.com/support/tutorial/Unlock_a_Forgotten_Lock_Pattern_Samsung_Moment/10887-339, date of access: May 31, 2012 (7 pages).
Support—Sprint Cell Phones SPH-M900—Samsung Cell Phones, http://www.samsung.com/us/support/owners/product/SPH-M900?tabContent-content2, date of access: May 31, 2012 (1 page).
T-Mobile Forum—Help & How to—Hidden Pattern, http://forums.t-mobile.com/tmbl/board/message?board.id=Android3&message.id=3511&query.id=52231#M3511, Oct. 23, 2008.
T-Mobile Forum—Help & How to—Screen Unlock Pattern, http://forums.t-mobile.com/tmbl/board/message?board.id=Android3&message.id=6015&query.id=50827#M6015, Oct. 22, 2008.
T-Mobile launches the highly anticipated T-Mobile G1, Oct. 22, 2008.
U.S. Office Action dated Oct. 15, 2012, issued in U.S. Appl. No. 13/560,270 (15 pages).
U.S. Office Action dated Oct. 17, 2012, issued in U.S. Appl. No. 13/563,943 (17 pages).
U.S. Office Action dated Oct. 18, 2012, issued in U.S. Appl. No. 13/563,182 (12 pages).
U.S. Office Action dated Oct. 23, 2012, issued in U.S. Appl. No. 12/764,298 (41 pages.).
U.S. Office Action dated Oct. 25, 2012, issued in U.S. Appl. No. 13/459,732 (15 pages).
U.S. Office Action dated Oct. 5, 2012, issued in U.S. Appl. No. 13/447,835 (20 pages).
U.S. Office Action dated Sep. 10, 2012, issued in U.S. Appl. No. 13/524,678 (12 pages).
U.S. Office Action dated Sep. 28, 2012, issued in U.S. Appl. No. 13/494,794 (14 pages).
U.S. Office Action for U.S. Appl. No. 12/764,298, dated Jul. 20, 2012, (38 pages).
U.S. Office Action for U.S. Appl. No. 13/482,705, dated Aug. 7, 2012, (10 pages).
User Guide Samsung Moment(TM) with Google(TM), dated Dec. 4, 2009 (122 pages).
User Guide Samsung Moment(TM) with Google(TM), dated Mar. 2, 2010 (218 pages).
Canadian Office Action dated Aug. 8, 2012, issued in Canadian Application No. 2,688,204 (3 pages).
Canadian Office Action dated Jul. 17, 2014, issued in Canadian Application No. 2,813,393, (4 pages).
Canadian Office Action dated Jul. 3, 2014, issued in Canadian Application No. 2,821,784, (3 pages).
Canadian Office Action dated Jul. 8, 2014, issued in Canadian Application No. 2,793,629, (4 pages).
Canadian Office Action dated Jun. 12, 2014, issued in Canadian Application No. 2,818,720, (3 pages).
Canadian Office Action dated Jun. 12, 2014, issued in Canadian Application No. 2,821,772, (2 pages).
Canadian Office Action dated Jun. 19, 2014, issued in Canadian Application No. 2,821,814, (3 pages).
Canadian Office Action dated Jun. 2, 2014, issued in Canadian Application No. 2,812,033, (3 pages).
Canadian Office Action dated Jun. 25, 2014, issued in Canadian Application No. 2,812,457, (5 pages).
Canadian Office Action dated Jun. 30, 2014, issued in Canadian Application No. 2,819,839, (3 pages).
Canadian Office Action dated Mar. 27, 2013, issued in Canadian Application No. 2,737,314 (3 pages).
Canadian Office Action dated May 13, 2014, issued in Canadian Application No. 2,789,827, (4 pages).
Canadian Office Action dated May 5, 2014, issued in Canadian Application No. 2,803,192, (4 pages).
Distinctive Touch: Gesture-based lightweight identification for touchscreen displays, Electronic Max, Dec. 7, 2004, http://courses.media.mit.edu/2004fall/mas622j/04.projects/students/VanKleek/; accessed online Apr. 27, 2009, pp. 1-11.
Enable or Disable SureType with a RIM BlackBerry Pearl Using Handheld Software, version 4.x, "http://www.wireless.att.com/support_static_files/KB/KB72601.html", at least as early as Feb. 8, 2008 (3 pages).
European Examination Report dated Apr. 11, 2014, issued in European Application No. 12182612.7, (5 pages).
European Examination Report dated Apr. 16, 2014, issued in European Application No. 11192713.3, (7 pages).
European Examination Report dated Apr. 5, 2013, issued in European Application No. 12180190.6 (7 pages).
European Examination Report dated Aug. 22, 2013, issued in European Application No. 12166520.2, (4 pages).
European Examination Report dated Aug. 22, 2013, issued in European Application No. 12173818.1, (6 pages).
European Examination Report dated Dec. 9, 2013, issued in European Application No. 12172458.7, (4 pages).
European Examination Report dated Jun. 2, 2014, issued in European Application No. 12166142.5, (4 pages).
European Examination Report dated Jun. 3, 2014, issued in European Application No. 12172458.7, (5 pages).
European Examination Report dated Mar. 12, 2014, issued in European Application No. 12169649.6, (7 pages).
Extended European Search Report dated Aug. 24, 2012, issued in European Application No. 12172458.7 (6 pages).
Extended European Search Report dated Aug. 27, 2012, issued in European Application No. 12169649.6 (7 pages).
Extended European Search Report dated Dec. 21, 2012, issued in European Application No. 12173818.1, (8 pages).
Extended European Search Report dated Jun. 26, 2013, issued in European Application No. 12184574.7 (10 pages).
Extended European Search Report dated May 6, 2009, issued in European Application No. 09151723.5 (7 pages).
Extended European Search Report dated Nov. 28, 2011, issued in European Application No. 11180985.1 (4 pages).
Final Office Action dated Apr. 11, 2014, issued in U.S. Appl. No. 13/447,704, (15 pages).
Final Office Action dated Apr. 25, 2013, issued in U.S. Appl. No. 13/564,697 (11 pages).
Final Office Action dated Apr. 4, 2013, issued in U.S. Appl. No. 13/447,835 (20 pages).
Final Office Action dated Aug. 29, 2014, issued in U.S. Appl. No. 13/485,723, (18 pages).
Final Office Action dated Dec. 13, 2013, issued in U.S. Appl. No. 13/572,232, (23 pages).
Final Office Action dated Feb. 10, 2014, issued in U.S. Appl. No. 13/485,723, (13 pages).
Final Office Action dated Jul. 2, 2014, issued in U.S. Appl. No. 13/534,101, (15 pages).
Final Office Action dated Jul. 24, 2014, issued in U.S. Appl. No. 13/616,423, (21 pages).
Final Office Action dated Jul. 25, 2013, issued in U.S. Appl. No. 13/560,796, (19 pages).
Final Office Action dated Jul. 28, 2014, issued in U.S. Appl. No. 13/569,000, (13 pages).
Final Office Action dated Jul. 30, 2013, issued in U.S. Appl. No. 13/459,301 (27 pages).
Final Office Action dated Jul. 9, 2013, issued in U.S. Appl. No. 13/564,070 (26 pages).
Final Office Action dated Mar. 26, 2014, issued in U.S. Appl. No. 13/564,697, (9 pages).

(56) References Cited

OTHER PUBLICATIONS

Final Office Action dated May 10, 2013, issued in U.S. Appl. No. 13/459,301 (16 pages).
Final Office Action dated May 15, 2013, issued in U.S. Appl. No. 13/563,182 (21 pages).
Final Office Action dated May 2, 2013, issued in U.S. Appl. No. 13/564,687 (17 pages).
Final Office Action dated May 29, 2012, issued in U.S. Appl. No. 12/362,536 (16 pages).
Final Office Action dated Oct. 26, 2011, issued in U.S. Appl. No. 12/362,536 (21 pages).
Final Office Action dated Sep. 15, 2014, issued in U.S. Appl. No. 13/601,736, (19 pages).
German Office Action dated Sep. 1, 2014, issued in German Application No. 112012000299.7-51, (6 pages).
Notice of Allowance dated Aug. 12, 2013, issued in U.S. Appl. No. 13/564,687, (10 pages).
Notice of Allowance mailed Oct. 11, 2013, issued in U.S. Appl. No. 13/563,943, (14 pages).
Office Action dated Apr. 11, 2014, issued in U.S. Appl. No. 13/481,171, (12 pages).
Office Action dated Apr. 11, 2014, issued in U.S. Appl. No. 13/572,232, (38 pages).
Office Action dated Apr. 18, 2014, issued in U.S. Appl. No. 13/524,678, (12 pages).
Office Action dated Apr. 21, 2014, issued in U.S. Appl. No. 13/601,736, (19 pages).
Office Action dated Dec. 6, 2013, issued in U.S. Appl. No. 13/564,697, (11 pages).
Office Action dated Jan. 31, 2014, issued in U.S. Appl. No. 13/534,101, (12 pages).
Office Action dated Jul. 21, 2014, issued in U.S. Appl. No. 13/525,576, (19 pages).
Office Action dated Jun. 11, 2014, issued in U.S. Appl. No. 13/563,182, (8 pages).
Office Action dated Jun. 8, 2011, issued in U.S. Appl. No. 12/362,536 (19 pages).
Office Action dated Mar. 12, 2014, issued in U.S. Appl. No. 13/616,423, (19 pages).
Office Action dated Mar. 14, 2014, issued in U.S. Appl. No. 13/569,000, (10 pages).
Office Action dated Mar. 26, 2014, issued in U.S. Appl. No. 13/548,469, (11 pages).
Office Action dated May 15, 2014, issued in U.S. Appl. No. 13/482,705, (12 pages).
Office Action dated May 2, 2014, issued in U.S. Appl. No. 13/459,301, (19 pages).
Office Action dated May 21, 2014, issued in U.S. Appl. No. 13/485,723, (18 pages).
Office Action dated May 30, 2013, issued in U.S. Appl. No. 13/572,232 (49 pages).
Office Action dated Nov. 22, 2013, issued in U.S. Appl. No. 13/447,704, (16 pages).
Office Action dated Oct. 17, 2013, issued in U.S. Appl. No. 13/485,723, (12 pages).
Office Action dated Sep. 8, 2014, issued in U.S. Appl. No. 13/601,864, (9 pages).
PCT International Search Report and Written Opinion dated Nov. 8, 2012, issued in International Application No. PCT/CA2012/050405 (12 pages).
Through the Magic Window—Magic Window word processor for the Apple II, Artsci Publishing, 1980, http://www.artscipub.com/history/magicwindow, accessed May 21, 2013 (5 pages).
touchpal (combination of two sources: first, youtube video on touchpal at url:http://www.youtube.com/watch?v=eJUWFEXxJal, dated on Dec. 1, 2011, with screen captures shown below; second, TimesofIndia website article on touchpal at url: http://articles.timesofindia.indiatimes.com/2012-01-29/computing/30673975_1_swype-android-market-qwerty, dated Jan. 29, 2012).
Office Action in U.S. Appl. No. 13/564,697, dated Dec. 6, 2013, 11 pages.
Office Action in U.S. Appl. No. 13/524,678, dated Feb. 28, 2013, 11 pages.
Office Action in U.S. Appl. No. 13/563,182, dated Jun. 11, 2014, 8 pages.
Office Action in U.S. Appl. No. 13/601,898, dated Jun. 18, 2014, 12 pages.

\* cited by examiner

RANKING PREDICTIONS BASED ON TYPING SPEED AND TYPING CONFIDENCE

FIELD

Example embodiments disclosed herein relate generally to input methodologies for electronic devices, such as handheld electronic devices.

BACKGROUND

Increasingly, electronic devices, such as computers, netbooks, cellular phones, smart phones, personal digital assistants, tablets, etc., have touchscreens that allow a user to input characters into an application, such as a word processor or email application. Character input on touchscreens can be a cumbersome task due to, for example, the small touchscreen area, particularly where a user needs to input a long message.

DETAILED DESCRIPTION

Reference will now be made in detail to various embodiments, examples of which are illustrated in the accompanying drawings. Wherever possible, the same reference numbers will be used throughout the drawings to refer to the same or like parts.

The present disclosure relates to an electronic device, such as a wired communication device (for example, a laptop computer having a touchscreen) or a mobile/handheld wireless communication device such as a cellular phone, smartphone, wireless organizer, personal digital assistant, wirelessly enabled notebook computer, tablet, or a similar device. The electronic device can also be an electronic device without wireless communication capabilities, such as a handheld electronic game device, digital photograph album, digital camera, or other device.

Predictive text input solutions have been introduced for assisting with input on an electronic device. These solutions include predicting which word a user is entering and offering a suggestion for completing and/or correcting the word.

Throughout this application, the terms "string" and "string of characters" are used interchangeably. Use of the indefinite article "a" or "an" in the specification and the claims is meant to include one or more features that it introduces, unless otherwise indicated. Thus, the term "a predicted string of characters" as used, for example, in "generating a predicted string of characters" can include the generation of one or more predicted strings of characters. Similarly, use of the definite article "the", or "said", particularly after a feature has been introduced with the indefinite article, is meant to include one or more features to which it refers (unless otherwise indicated). Therefore, the term "the predicted string" as used, for example, in "displaying the predicted string" includes displaying one or more predicted strings.

In one embodiment, a method is provided that receives an input string, ranks, by the processor, a predicted string associated with the input string, wherein the ranking depends on whether the input string is a substring of the predicted string and at least on one of a typing speed and a typing confidence, and displays the ranked predicted string. The predicted string is, for example, the product of a prediction algorithm. This and other embodiments described below provide the user with better predictions of the intended input. Better predictions can improve text input speed, reduce processing cycles and, in some instance, save power.

Figure 1:
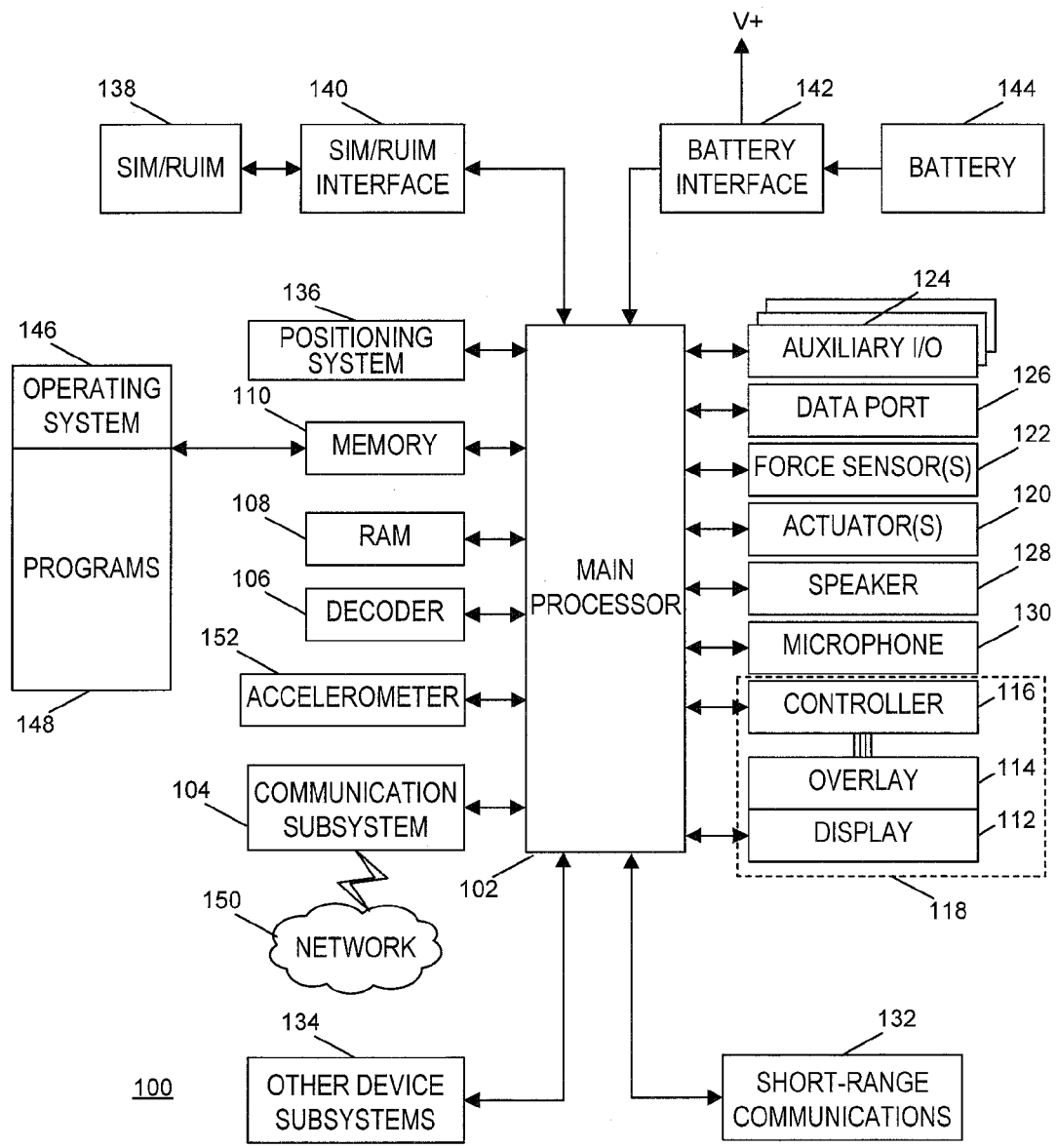
FIG. 1 is an example block diagram of an electronic device, consistent with embodiments disclosed herein.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; an accelerometer 152; other device subsystems 134; and a touchscreen 118.

Device 100 includes a man-machine interface, for example, touchscreen 118, which includes a display 112 with a touch-active overlay 114 connected to a controller 116. User-interaction with a graphical user interface (GUI), such as a virtual keyboard rendered on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are inputted when the user touches the touchscreen at a location associated with said character.

Touchscreen 118 is connected to and controlled by main processor 102. Accordingly, detection of a touch event and/or determining the location of the touch event can be performed by touchscreen 118, and touch data related to the touch event can then be provided to main processor 102. In some embodiments, touchscreen 118 communicates with main processor 102 through a touchscreen controller (not shown), which can process the touch data provided by touchscreen 118 and provide processed touchscreen data to main processor 102. A touch event includes, in some embodiments, a tap by a finger, a swipe by a finger, a swipe by a stylus, a long press by finger or stylus, a press by a finger for a predetermined period of time, and the like.

While specific embodiments of a touchscreen have been described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

When the user touches touchscreen 118, touchscreen 118 can register a two-dimensional imprint of the touch. Touchscreen 118 can analyze the imprint and provide to main processor 102 the (X,Y) coordinates of the center of the touch, the geometrical characteristics of the touch, the pressure applied by the touch, and so forth. The geometrical characteristics include, for example, parameters defining the geometrical shape (e.g., circle, ellipse, square) approximating the touch area.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUM interface 140 for communication with a network, such as network 150. Alternatively, user identification information can be programmed into memory 110.

Electronic device 100 also includes an operating system 146 and programs 148 that are executed by main processor 102 and that are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, or web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2:
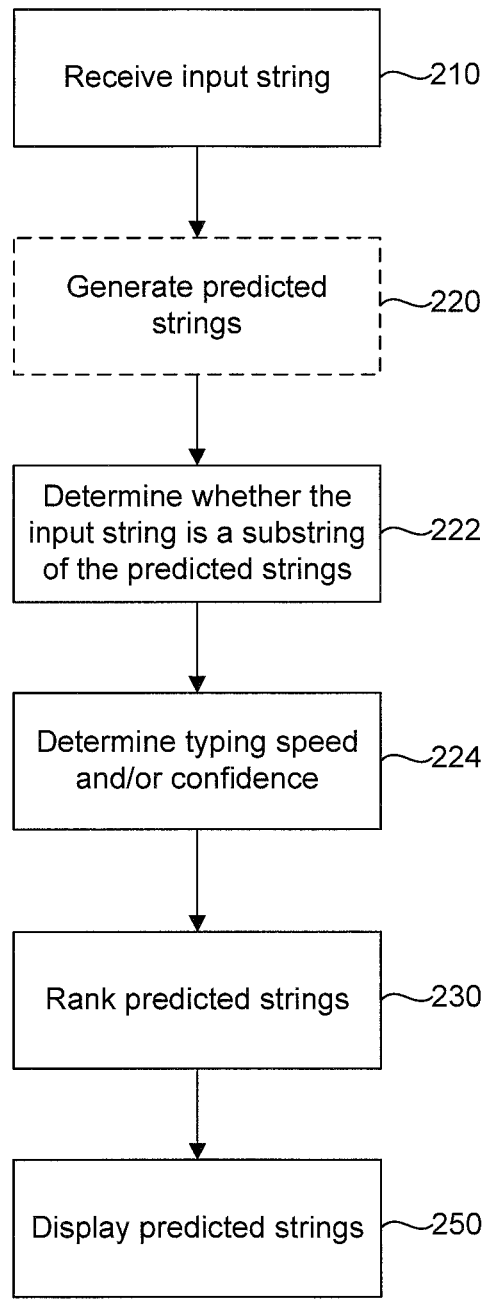
FIG. 2 is a flowchart illustrating an example method for generating, ranking, and displaying predicted strings, consistent with embodiments disclosed herein.

FIG. 2 is a flowchart illustrating an example method 200 for generating, ranking and displaying predicted strings of characters (hereinafter, "predicted strings"), consistent with example embodiments disclosed herein. As used herein, a predictor (such as a predictive algorithm, program, firmware, or a dedicated hardware module) includes a set of instructions that when executed by a processor (e.g., main processor 102), can be used to disambiguate received ambiguous text input and provide various predicted strings (for example, words or phrases, acronyms, names, slang, colloquialisms, abbreviations, or any combination thereof) based on the input. A predictor can also receive otherwise unambiguous text input and generate predicted strings potentially contemplated by the user based on several factors, such as context, frequency of use, and others as appreciated by those skilled in the field.

In an example embodiment, the predictor is one of the programs 148 residing in memory 110 of electronic device 100. Accordingly, method 200 includes a predictor for generating predicted strings corresponding to the input string of characters. It can be appreciated that while the example embodiments described herein are directed to a predictor program executed by a processor, the predictor can be executed, for example, by a virtual keyboard controller.

Method 200 begins at block 210, where the processor (e.g., main processor 102) receives an input string of one or more characters (hereinafter, "input string") from a virtual keyboard displayed on touchscreen 118. As used herein, a character can be any alphanumeric character, such as a letter, a number, a symbol, a punctuation mark, and the like.

At block 220, the processor optionally generates one or more predicted strings such as words or phrases, acronyms, names, slang, colloquialisms, abbreviations, or any combination thereof based on the input string received in block 210. The predicted strings include, for example, strings that are stored in a dictionary of a memory of the electronic device (for example, words or acronyms), strings that were previously inputted by the user (for example, names or acronyms), strings based on a hierarchy or tree structure, a combination thereof, or any strings selected by a processor based on defined arrangement.

In some embodiments, the processor can use contextual data for generating a predicted string. Contextual data considers the context in which the input string is entered. Contextual data can include, for example, information about strings previously inputted by the user, grammatical attributes of the input string (for example, whether a noun or a verb is needed as the next string in a sentence), or any combination thereof. For example, if the string "the" has already been inputted into display, the processor can use the contextual data to determine that a noun or an adjective—instead of a verb—will be the next string after "the". Likewise, if the string "Guy Lafleur played in the National Hockey" was inputted, based on the context, the processor can determine the subsequent string is likely to be "League". Using the contextual data, the processor can also determine whether one or more characters in the input string are incorrect. For example, the processor can determine that the inputted character was supposed to be a "w" instead of an "a", given the proximity of these characters on a QWERTY virtual keyboard. Any known predictive technique or software can be used to process the input string and the contextual data in generating the predicted strings at block 220.

In some embodiments, a predicted string generated at block 220 can begin with the input string; in other words, the input string can constitute a prefix (a sub string) of the predicted string. For example, if the characters "pl" are received as the input string from a virtual keyboard, the predicted strings generated at block 220 can begin with "pl", and can include "please", "plot", and "place". Similarly, if the user enters the input string "child", the predicted strings generated at block 220 can include "children" and "childish".

In some example embodiments, the processor can generate at block 220 predicted strings to which the input string is not a prefix (substring). For example, if the user inputs the string "id", the processor can generate a predicted string "I'd", even though "id" is not a substring of "I'd". As another example, the processor can generate a predicted string "receive" for the input string "reci" (in case the user makes a spelling mistake or a typo). Because the input string does not have to be an exact substring of the predicted string, the user is allowed to make spelling or typing mistakes, use abbreviations, disregard the letter case, and so forth. Thus, the user can significantly increase the typing speed without sacrificing accuracy, by relying on the electronic device to automatically complete the input and correct it, if needed.

Predicted strings that do not begin with the input string (predicted strings to which the input string is not a substring) may be referred to as "correcting predicted strings", and predicted strings that begin with the input string (predicted strings to which the input string is a substring) may be referred to as "non-correcting predicted strings."

In some example embodiments, the processor can generate more than one predicted string based on the input string, where some of the predicted strings can be correcting and some non-correcting. For example, if the user inputs the string "id", the processor can disambiguate the input and generate the predicted strings "I'd", "ID", "is", and "idea" as probable intended inputs. In another example, if the user inputs the string "misp", the processor can generate the predicted strings "misplaced" and "misspelled". In both examples, some of the generated strings are correcting ("I'd", "ID", "is", "misspelled") and some are non-correcting ("idea", "misplaced").

In some example embodiments, the predicted strings are not generated by the main processor 102. In these embodiments, main processor 102 provides the input string, for example, to a prediction processor (not shown), which generates predicted strings based on the provided input string, and sends the predicted strings to main processor 102. The prediction processor can be a software- or hardware-based module communicatively coupled to main processor 102. The prediction processor can be either local or remote to electronic device 100.

At block 222, the processor determines, for example, for each predicted string, whether it is a correcting predicted string or a non-correcting predicted string (i.e., whether or not the input string is a substring of the predicted string). At block 224, the processor determines, for example, the typing speed and/or the typing confidence, as will be explained in detail below.

At block 230, the predicted strings generated at block 220 are ranked, as discussed in detail below. The ranking of a predicted string reflects the likelihood (probability) that the user intends to input that predicted string, that is, the likelihood that the predicted string is the intended input, given the already inputted input string.

At block 240, the processor displays one or more of the ranked, predicted strings on display 112. The displayed strings can be displayed at or near the input field, on the virtual keyboard (for example, on or near the <space> key or on keys corresponding to characters predicted as the next characters the user might input) or at any other suitable display location. In some embodiments, the processor can limit the number of ranked strings to display. For example, the processor can choose to display only a predetermined number (1, 3, 10, etc.) of the highest-ranked predicted strings.

Ranking the Generated Strings

In some embodiments, contextual data can be included in the ranking at block 230. For example, the electronic device can be configured to rank nouns or adjectives higher based on the previous input strings. If the input string is suggestive of a noun or adjective, the processor, using the contextual data, can rank higher those predicted strings that correspond to nouns or adjectives. In some embodiments, contextual data can include information about which programs or applications are currently running or being used by a user. For example, if the user is running an email application, then strings associated with that user's email system, such as strings from the user's contact list, can be used to determine the ranking. N-grams, including unigrams, bigrams, trigrams, and the like, can be also used in the ranking of the predicted strings.

Additionally, the geolocation of the electronic device or user can be used in the ranking process. If, for example, the electronic device recognizes that a user is in an office building, then predicted strings that are generally associated with work can be ranked higher in the list. If, on the other hand, the device determines that the user is at the beach, then predicted strings generally associated with the beach can be ranked higher in the list.

Ranking as a Function of a Typing Speed

In some embodiments, the ranking at block 230 can be based on the typing speed of the user inputting the string in the first instance. For example, if the processor determines (e.g., at block 224) that the user is typing fast (e.g., faster than a predetermined threshold) then the processor can decide that the likelihood that a user made a typo or neglected to properly spell or capitalize words is higher. Consequently, in some embodiments, the processor can increase the ranking of correcting predicted strings relative to non-correcting predicted strings, when the user types faster. For example, if the user types "id" and the processor determines a fast typing speed, the processor can boost (increase) the ranking of the corrected predicted string "I'd", and decrease the ranking of the non-correcting predicted string "idea", or keep its ranking unchanged. Assuming, for example, that the two predicted strings were ranked similarly before typing speed was factored in, such an adjustment in rankings can render "I'd" being ranked higher than "idea".

As discussed above, the rankings can determine which predicted strings are displayed at step 240 (and in which order) and which predicted strings are not displayed. Thus, for example, when the processor displays only the highest ranked predicted string, or when the processor displays a predetermined number of highest ranked predicted strings and "idea" and "I'd" compete for the last displayed position, only "I'd" would be displayed in the above example, while "idea" would not.

In some embodiments, the ranking of correcting predicted strings is in direct relationship with the typing speed. In other words, the ranking increases when the typing speed increases, and decreases when the typing speed decreases. In some embodiments, the ranking is a monotonically increasing (or non-decreasing) function of the typing speed: it stays the same or increases when the typing speed increases, and it stays the same or decreases when the typing speed decreases. In some embodiments, the ranking of correcting predicted strings is a strictly increasing function of the typing speed, that is, it always increases when the typing speed increases and it always decreases when the typing speed decreases. The direct relationship between the ranking of the correcting predicted string and the typing speed can be, for example, proportional, exponential, differentiable or not differentiable, etc.

In some embodiments, the ranking function can have one or more predetermined thresholds. For example, typing speeds above a maximum threshold can be rounded to that maximum threshold, and typing speeds below a minimum threshold can be rounded to that minimum threshold and considered "low" or zero speed. In some embodiments, the ranking function can be designed such that a low or zero typing speed will not boost the ranking of a correcting predicted string.

In some embodiments, when the typing speed is high, instead of (or in addition to) increasing the ranking of the correcting predicted strings, the processor can decrease the ranking of the non-correcting predicted strings. For example, the ranking of non-correcting predicted strings can be set to be in inverse relationship with the typing speed, while the ranking of correcting predicted strings can be independent of the typing speed.

In some embodiments, the ranking of both types of predicted strings can depend on the typing speed. For example, the ranking of correcting predicted strings can be in direct relationship with the typing speed, while the ranking of non-correcting predicted strings can be in reverse relationship with the typing speed.

The typing speed can be defined and measured by the processor using any suitable means. In some embodiments, the typing speed is defined, for example, as the average speed (e.g., in characters per second) over the last O inputted characters, last P words, last Q seconds, or any combination thereof, where O, P, and Q can be different predetermined numbers. In some embodiments, the typing speed can be determined by combining the short-term speed (the speed with which the last several characters were typed) with the long-term speed (for example, the average speed across the entire input text).

Ranking as a Function of a Typing Confidence

In some embodiments, the ranking at block 230 depends on the typing confidence value that reflects the confidence with which the user selects (touches on) keys on a virtual keyboard. Because confident typing can be correlated with a lower likelihood of a mistake, the processor can boost (increase) the ranking of the non-correcting predicted strings when the typing confidence is high. When the typing confidence is low, the processor can, for example, keep the ranking of the non-correcting predicted strings unchanged, or lower the ranking.

In some embodiments, the ranking of non-correcting predicted strings is in direct relationship with the typing confidence. In other words, the ranking increases when the typing confidence increases, and decreases when the typing confidence decreases. In some embodiments, the ranking is a monotonically increasing (or non-decreasing) function of the typing confidence: it stays the same or increases when the typing confidence increases, and it stays the same or decreases when the typing confidence decreases. In some embodiments, the ranking of non-correcting predicted strings is a strictly increasing function of the typing confidence, that is, it always increases when the typing confidence increases and it always decreases when the typing confidence decreases. The direct relationship (the function) can be, for example, proportional, exponential, differentiable or not differentiable, etc.

In some embodiments, the ranking function can have one or more predetermined thresholds. For example, a typing confidence above a maximum threshold can be rounded to that maximum threshold, and a typing confidence below a minimum threshold can be rounded to that minimum threshold and considered "low" or zero confidence. In some embodiments, the ranking function can be designed such that a low or zero typing confidence will not boost the ranking of a non-correcting predicted string.

In some embodiments, when the typing confidence is high, instead of (or in addition to) increasing the ranking of the non-correcting predicted strings, the processor can decrease the ranking of the correcting predicted strings. For example, the ranking of correcting predicted strings can be set to be in inverse relationship with the typing confidence, while the ranking of non-correcting predicted strings can be independent of the typing confidence. In some embodiments, the ranking of both types of predicted strings can depend on the typing confidence. For example, the ranking of non-correcting predicted strings can be in direct relationship with the typing confidence, while the ranking of correcting predicted strings can be in reverse relationship with the typing confidence.

The typing confidence can be measured by the processor, for example, by estimating the confidence with which the user touches the virtual keyboard on touchscreen 118 during typing. In some embodiments, the confidence of an individual touch is a function of the strength of the touch. In some embodiments, the touchscreen 118 is configured to measure the strength (e.g., the applied pressure) directly, in which case the strength measurement can be passed by touchscreen 118 to the processor.

In other embodiments, the confidence of a touch can be determined based on the area of location of the touch, because strong and confident touches can be correlated with larger touch areas. The touch area can be calculated by touchscreen 118 and passed to the processor as a parameter, for example, along with the (X,Y) coordinates of the center of the touch area. Alternatively, in some embodiments, touchscreen 118 passes to the processor parameters defining the approximated shape (square, circle, ellipse, etc.) formed by the touch, in which case, the processor can calculate the size (the area) of the shape. In some embodiments, touchscreen 118 can pass to the processor raw data corresponding to the touch—unprocessed signal data registered by touchscreen 118 during the touch—and the processor can process the data, calculate the area, and derive the touch confidence value. Touch confidence can be a linear function of the touch area, or it can be an exponential function, a quadratic function, or any other suitable type of function.

In some embodiments, typing confidence can be calculated as the average or median value of touch confidence values corresponding to one or more recent touches by the user. For example, the processor can calculate the average touch confidence across a predetermined number of most recent touches (character inputs) by the user. As another example, the processor can first determine a long-term confidence baseline by averaging touch confidence values over a large number of touches, and then combine the baseline information with the short-term information regarding the most recent touches. In some embodiments, the processor can give more weight to the touches corresponding to characters at which the mistake has potentially occurred. In some embodiments, the processor can also consider how close the center of the touch is to the center of the corresponding key, when estimating typing confidence.

In some embodiments, typing confidence can be derived based on the stability of electronic device 100. For example, if the processor determines that the device is unstable and is shaking a lot (e.g., the user is texting from a taxi, or while walking), the processor can decide that the likelihood of mistake is higher. The processor can therefore rank correcting predicted strings higher relatively to the non-correcting predicted strings, using, for example, any of the methods described above in connection to typing speed and typing confidence. In some embodiments, the level of stability of electronic device 100 can be determined using accelerometer 152. For example, accelerometer 152 can provide to the processor acceleration data indication the level of acceleration of the device in one or more directions. The processor can then determine, for example, that when the acceleration in any one direction exceeds a predetermined acceleration threshold, the device is no longer "stable".

In some embodiments, the processor can combine information regarding the typing speed, the typing confidence, device stability, and any other relevant information when ranking predicted strings. The processor can use any suitable function that combines the factors, such as a linear combination of the factors, wherein each factor can be weighed differently.

Figure 3:
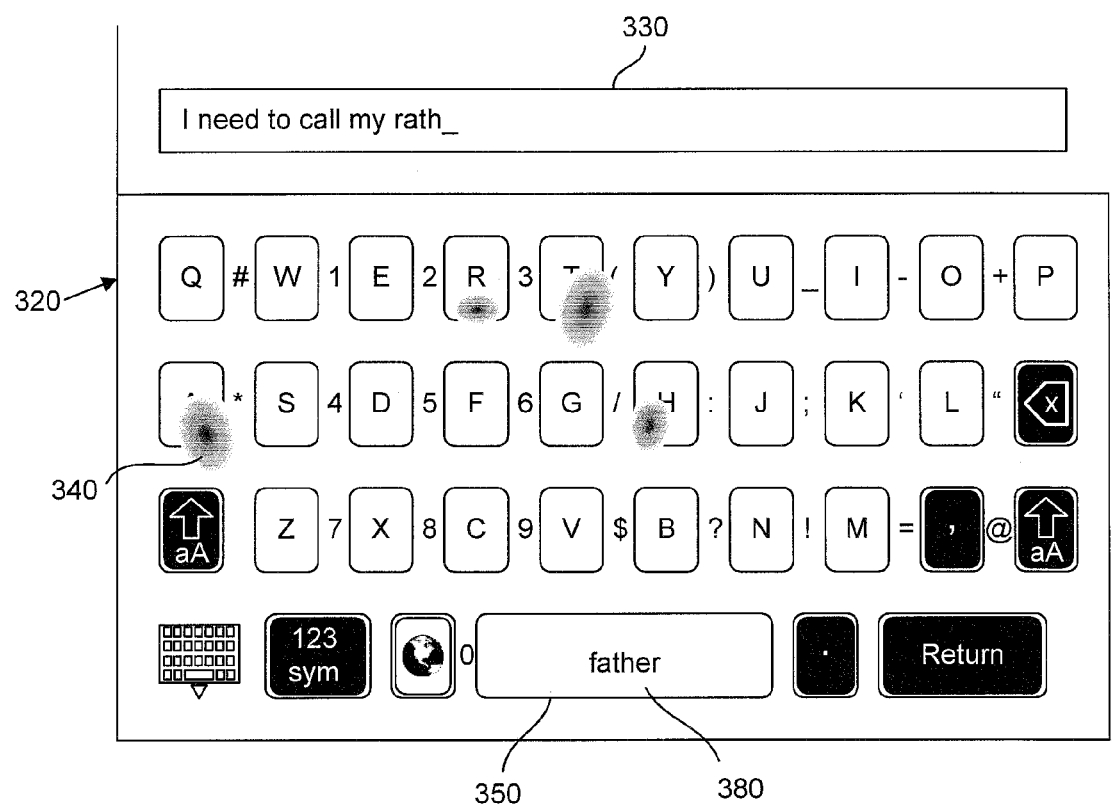
FIG. 3 shows an example front view of a touchscreen, consistent with embodiments disclosed herein.

FIG. 3 illustrates an example front view of touchscreen 118 having a virtual keyboard 320, consistent with example embodiments disclosed herein. The position of the virtual keyboard 320 is variable such that virtual keyboard 320 can be placed at any location on touchscreen 118. Touchscreen 118 could be configured to detect the location, the size and possibly pressure of the user's touches. Touchscreen 118 includes two areas: (1) an input field 330 that displays characters inputted by the user and (2) the virtual keyboard 320 that receives the input from the user. As shown in FIG. 3, touchscreen 118 displays a virtual keyboard 320 having a standard QWERTY layout; however, any keyboard layout can be displayed for use in the device, such as AZERTY, QWERTZ, or a layout based on the International Telecommunication Union (ITU) standard (ITU E.161) having "ABC" on key 2, "DEF" on key 3, and so on. Virtual keyboard 320 includes a space key 350 as well as other keys that can provide different inputs, such as punctuation, letters, numbers, enter or return keys, and function keys.

As shown in FIG. 3, the user has already inputted the text "I need to call my rath". Touch areas 340 correspond to the user's last four touches on keys "R", "A", "T", and "H". The processor receives (210) the input string "rath", and generates (220) predicted strings based on the input string. For example, the processor generates two predicted strings: "rather" and "father". As discussed above, "rather" is a non-correcting predicted string because the input string "rath" is its substring. In contrast, "father" is a correcting predicted string because the input string is not its substring. The correcting predicted string "father" can be generated by the processor, for example, because of its similarity to the input string and also because the keys "R" and "F" are closely positioned on the virtual keyboard, which could suggest a possible typo.

The processor then ranks (230) the two predicted strings. The processor can first rank the non-correcting predicted string "rather" using a formula that is based on a number of factors discussed above, such as the contextual data, N-gram data, geolocation data, etc. The processor can then rank the correcting predicted string "father". Because "father" is a correcting predicted string, it can be ranked using different or additional factors. For example, the processor can include the same factors that were used for ranking the non-correcting predicted string "rather", but then also consider the typing speed and/or the typing confidence. In this example, "rather" is ranked higher than "father" when the ranking is based only on factors such as the contextual data, N-gram data, geolocation data, etc. However, assuming that the processor determines a high typing speed and/or low typing confidence (given the small touch areas 340, for example), these additional factors can boost the ranking of the correcting predicted string "father" relatively to the non-correcting predicted string "rather", and render "father" as the highest-ranked predicted string.

In some embodiments, the processor can rank the predicted strings by first assigning each predicted string a score based on factors other than the typing speed and typing confidence. The processor then adjusts the scores based on the typing speed and/or typing confidence. For example, if the typing speed is high and/or the typing confidence is low, the processor can multiply the scores of the correcting strings by a factor greater than one (e.g., 1.2) and/or multiply the scores of the non-correcting strings by a factor smaller than one (e.g., 0.8). Similarly, if the typing speed is low and/or the typing confidence is high, the processor can multiply the scores of the non-correcting strings by a factor greater than one and/or multiply the scores of the correcting strings by a factor smaller than one.

In the example illustrated in FIG. 3, the processor can first assign scores based on the contextual data, N-gram data, and geolocation data, as described above, and assign the following scores, first:

| Predicted String | Score |
| --- | --- |
| rather | 0.57 |
| father | 0.52 |

The scores can, but do not have to, be normalized so that the sum of all the scores equals 1, in which case each score can represent the probability of the corresponding predicted string to be the one intended by the user.

The processor then considers the typing speed and the typing confidence and adjusts the scores accordingly. Assuming, for example, that the user is typing very fast and/or with a very low typing confidence, the processor can increase the score of the correcting predicted string for example, by a factor of 1.2. The resulting scores would then become:

| Predicted String | Score |
| --- | --- |
| rather | 0.57 |
| father | 0.52 × 1.2 = 0.624 |

Thus, in this example, the correcting predicted string "father" emerges as the predicted string with the highest score (i.e., as the highest-ranked predicted string). In some embodiments, the scores can be increased (or decreased) by a predetermined percentage, by a predetermined value, or using any other adjustment formula.

The processor then displays (240) one or more predicted strings on touchscreen 118. In this example, the processor can decide to display only the highest-ranked predicted string, in which case only the correcting predicted string "father" 380 is displayed on space key 350.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other embodiments of the invention will be apparent to those skilled in the art from consideration of the specification and practice of the invention disclosed herein. It is intended that the specification and examples be considered as examples only, with a true scope and spirit of the invention being indicated by the following claims

What is claimed is:

1. An input method for a communication device having a processor, the method comprising:
receiving an input character string;
ranking, by the processor, a predicted character string associated with the input character string, wherein the ranking depends on whether the input character string is a substring of the predicted character string and at least on one of a typing speed and a typing confidence, wherein the typing speed reflects a speed at which the character string is input, and wherein the typing confidence reflects a confidence in a detected input associated with the input character string; and
displaying the ranked predicted character string.

2. The method of claim 1, wherein the ranking is in direct relationship with the typing speed if the input character string is not a substring of the predicted character string.

3. The method of claim 1, wherein the ranking is in inverse relationship with the typing speed if the input character string is a substring of the predicted character string.

4. The method of claim 1, wherein the typing speed comprises the average typing speed across a predetermined number of most recently typed characters.

5. The method of claim 1, further comprising determining the typing confidence based at least on the strength of one or more touches associated with the input character string.

6. The method of claim 5, further comprising determining the strength of the touches based on the area of the location of the touch.

7. The method of claim 5, wherein the ranking is in direct relationship with the typing confidence if the input character string is a substring of the predicted character string.

8. The method of claim 5, wherein the ranking is in inverse relationship with the typing speed if the input character string is not a substring of the predicted character string.

9. The method of claim 5, wherein the typing speed comprises the average typing speed across a predetermined number of most recently typed characters.

10. The method of claim 1, wherein displaying the ranked predicted character string comprises displaying the ranked predicted character string responsive to a determination that the ranked predicted character string is among a predetermined number of most highly ranked predicted character strings.

11. An electronic device comprising a display and a processor, the processor configured to perform:
receiving an input character string;
ranking a predicted character string associated with the input character string, wherein the ranking depends on whether the input character string is a substring of the predicted character string and at least on one of a typing speed and a typing confidence, wherein the typing speed is based on a typing speed value determined with respect to a predetermined threshold value, and wherein the typing confidence is based on a typing confidence value that reflects the confidence with which the input character string is input; and
displaying the ranked predicted character string on the display.

12. The electronic device of claim 11, wherein the ranking is in direct relationship with the typing speed if the input character string is not a substring of the predicted character string.

13. The electronic device of claim 11, wherein the ranking is in inverse relationship with the typing speed if the input character string is a substring of the predicted character string.

14. The electronic device of claim 11, wherein the typing speed comprises the average typing speed across a predetermined number of most recently typed characters.

15. The electronic device of claim 11, wherein the processor is further configured to perform:
determining the typing confidence based on the strength of one or more touches associated with the input character string.

16. The electronic device of claim 15, wherein the processor is further configured to perform:
determining the strength of the touches based on the area of the location of the touch.

17. The electronic device of claim 15, wherein the ranking is in direct relationship with the typing confidence if the input character string is a substring of the predicted character string.

18. The electronic device of claim 15, wherein the ranking is in inverse relationship with the typing speed if the input character string is not a substring of the predicted character string.

19. The electronic device of claim 15, wherein the typing speed comprises the average typing speed across a predetermined number of most recently typed characters.

20. The electronic device of claim 11, wherein displaying the ranked predicted character string comprises displaying the ranked predicted character string responsive to a determination that the ranked predicted character string is among a predetermined number of most highly ranked predicted character strings.

* * * * *